(12) United States Patent
Natarajan et al.

(10) Patent No.: US 9,059,899 B2
(45) Date of Patent: Jun. 16, 2015

(54) METHOD AND SYSTEM FOR INTERRUPT THROTTLING AND PREVENTION OF FREQUENT TOGGLING OF PROTECTION GROUPS IN A COMMUNICATION NETWORK

(75) Inventors: Badrinath Natarajan, Dallas, TX (US); Calvin Wan, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 273 days.

(21) Appl. No.: 13/227,171

(22) Filed: Sep. 7, 2011

(65) Prior Publication Data

US 2013/0058210 A1 Mar. 7, 2013

(51) Int. Cl.
*H04L 12/26* (2006.01)
*H04L 12/24* (2006.01)

(52) U.S. Cl.
CPC ........ *H04L 41/0622* (2013.01); *H04L 41/0663* (2013.01)

(58) Field of Classification Search
CPC . H04L 45/28; H04L 41/06; H04L 2012/5627; H04L 43/16; H04L 69/40; H04J 2203/006; H04Q 2011/0081
USPC ........ 370/216–217, 225, 242; 398/5
See application file for complete search history.

(56) References Cited

U.S. PATENT DOCUMENTS

| | | | |
|---|---|---|---|
| 5,991,312 A * | 11/1999 | Koenig et al. | 370/535 |
| 6,275,510 B1 * | 8/2001 | Koenig et al. | 370/535 |
| 6,606,630 B1 * | 8/2003 | Gunlock | 707/783 |
| 6,760,308 B1 * | 7/2004 | Ghanma et al. | 370/235 |
| 7,710,882 B1 * | 5/2010 | Previdi et al. | 370/238 |
| 7,822,028 B1 * | 10/2010 | Rimmer | 370/389 |
| 8,214,492 B2 * | 7/2012 | Chauvin et al. | 709/224 |
| 2003/0012135 A1 * | 1/2003 | Leroux et al. | 370/228 |
| 2013/0051236 A1 * | 2/2013 | Bush | 370/237 |

OTHER PUBLICATIONS

ITU-T; "G.8031/Y.1342—Ethernet Protection Switching"; International Telecumminucation Union; pp. 52, Jun. 2006.

* cited by examiner

*Primary Examiner* — Benjamin Lamont
(74) *Attorney, Agent, or Firm* — Baker Botts L.L.P.

(57) ABSTRACT

A method may include determining a first number of events occurring during a first threshold detection duration. The method may further include causing processing of events to cease for a particular throttling duration in response to determining that the first number of events occurring during the threshold detection duration is greater than a predetermined threshold. The method may also include determining a second number of events occurring during a second threshold detection duration. Additionally, the method may include, in response to determining that the first number of events occurring during the first threshold detection duration is greater than the predetermined threshold and that the second number of events occurring during the second threshold detection duration is greater than the predetermined threshold: increasing the time of the particular throttling duration; and causing processing of events to cease for the increased particular throttling duration.

15 Claims, 2 Drawing Sheets

METHOD AND SYSTEM FOR INTERRUPT THROTTLING AND PREVENTION OF FREQUENT TOGGLING OF PROTECTION GROUPS IN A COMMUNICATION NETWORK

TECHNICAL FIELD OF THE INVENTION

The present invention relates generally to optical networks and, more particularly, to a method and system for protection switching in an optical system.

BACKGROUND

Telecommunications systems, cable television systems and data communication networks use optical and or Ethernet networks to rapidly convey large amounts of information between remote points. To ensure high reliability and availability in communications networks, including optical and Ethernet communications networks, protection switching is often used. When implemented, protection switching typically provides a primary or "working" path for a network and a redundant or "protection" path for the network. Accordingly, each path may be monitored, and if a fault is detected on the working path, network traffic may be switched to the protection path. An example of protection switching may be Ethernet Linear Protection Switching (ELPS) as defined by the ITU G.8031 standard.

With protection switching in optical communication networks, an optical signal may be transmitted via two or more optical paths between the same source and destination node. A selector at the destination may include a photodetector for each path to monitor signals received from the two or more paths. Based on such received signals, the selector may select one of the signals to be forwarded to a transponder or receiver at the destination node. For example, the selector may determine, based on the photodetector monitoring, whether one of the paths has experienced a loss of signal or "loss of light." If a particular path experiences a loss of light, then the selector may, via communication of interrupt signals or other appropriate signals, select another path to forward to the transponder or receiver. Such selection may be referred to as a "protection switch."

The selector may operate in accordance with a protection switching protocol (e.g., ITU G.8031 or other standard). Each protection switching protocol may include a hierarchy for handling user-initiated and auto-fault initiated protection switching requests. Such hierarchy may be implemented via hardware, software, or a combination thereof.

In certain instances, a working path of a protection switching group may be subject to intermittent protection switching interrupts. Such interrupts may be of the nature that the working path may operate normally for periods of time, but intermittently generate interrupts due to a particular problem associated with a communication network, sometimes even in cases in which a working path has not failed and protection switching is not needed to maintain communication of traffic. For example, among the reasons an intermittent protection switching interrupt may occur include, without limitation, a bent transmission medium (e.g., cable or fiber) within the working path; a cut transmission medium within the working path; incorrect or lose transmission media connections to network elements of the working path; a transmission medium short within the working path; electromagnetic interference in the working path; faulty connectors interfacing transmission media to network elements in the working path; loss of heartbeat messages (e.g., Continuity Check Messages) by network elements of the working path due to congestion, collision and/or other cause; and/or a degraded signal along the transmission path.

In traditional communication networks, such intermittent interrupts may result in frequent toggling between the working path and the protection path, causing periodic traffic loss upon the occurrence of each intermittent fault, and heavy use of system resources (e.g., processing and memory capacity) potentially leading to system instability or crashes.

One traditional solution to the problem of intermittent interrupts is to employ a hold off timer. Upon an initial detection of a fault on a working path, the fault may not be reported in the form of an interrupt, and the hold off timer may be initiated. At expiration of the hold off timer, a system may determine whether the fault still exists. If the fault remains after expiration of the hold off timer, the system may then generate an interrupt, and protection switching may occur. If the fault clears during the duration of the hold off timer, then no interrupt is generated and protection switching does not occur. However, a disadvantage of a hold off timer is that during the duration of the hold off timer, traffic may not flow over either of the working path or the protection path, leading to potential traffic loss during such duration. Thus, in the presence of bona fide working path failures, a hold off timer does not serve to reduce interrupts, but may instead lead to traffic loss.

SUMMARY

In accordance with a particular embodiment of the present disclosure, a method may include determining a first number of events occurring during a first threshold detection duration. The method may further include causing processing of events to cease for a particular throttling duration in response to determining that the first number of events occurring during the threshold detection duration is greater than a predetermined threshold. The method may also include determining a second number of events occurring during a second threshold detection duration. Additionally, the method may include, in response to determining that the first number of events occurring during the first threshold detection duration is greater than the predetermined threshold and that the second number of events occurring during the second threshold detection duration is greater than the predetermined threshold: increasing the time of the particular throttling duration; and causing processing of events to cease for the increased particular throttling duration. In some embodiments, the particular throttling duration may be based on an exponential backoff algorithm.

Technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
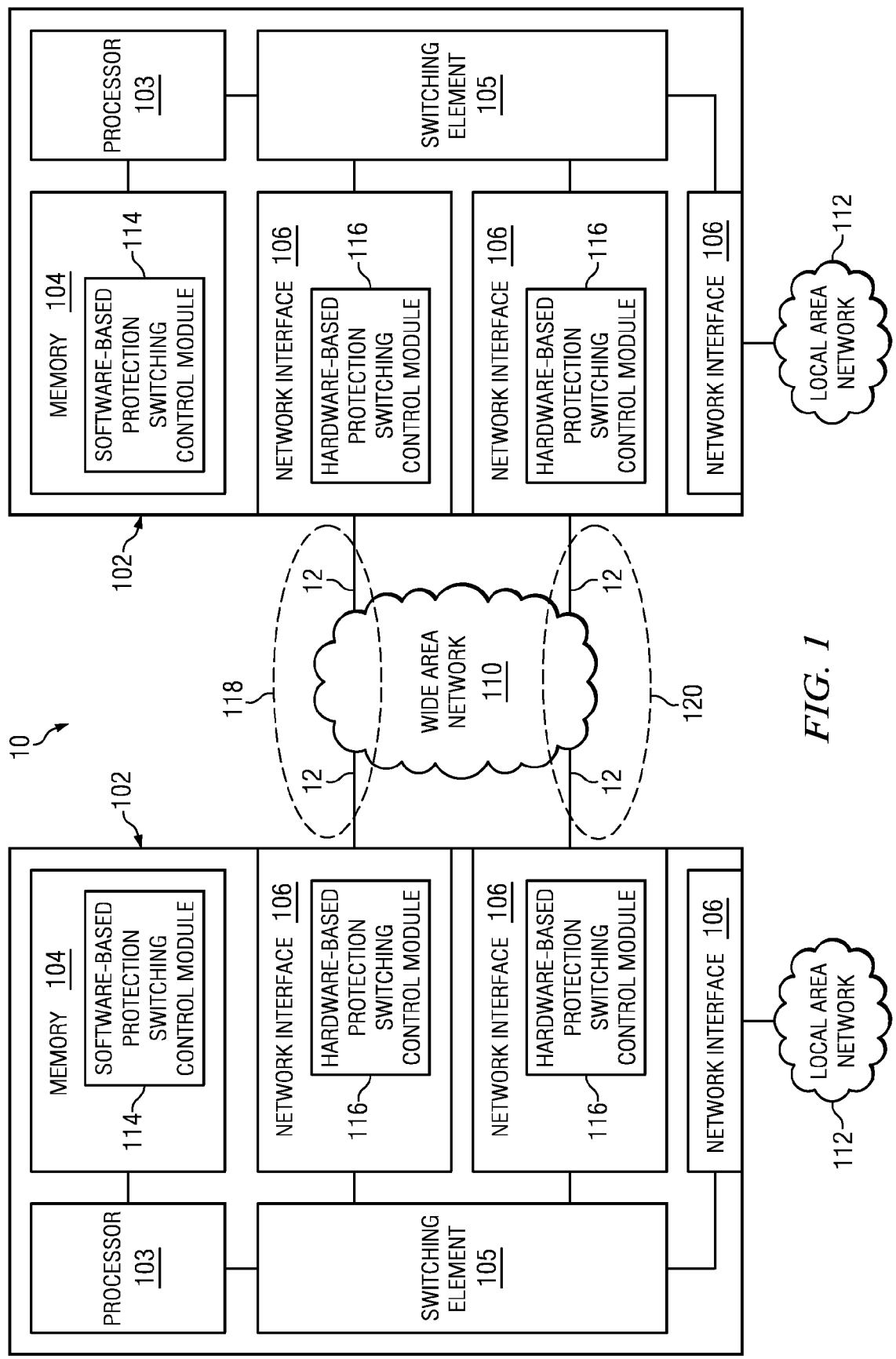
FIG. 1 is a block diagram illustrating an example communication network, in accordance with certain embodiments of the present disclosure.

FIG. 1 illustrates a block diagram of an example communications network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a network elements 102, a wide area network 110 coupled between network elements 102, and a local area network 112 coupled to and associated with each network element 102. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each transmission medium 12 may include any system, device, or apparatus configured to communicatively couple network devices 102 to other components of network 10 (e.g., wide area network 110 and/or local area networks 112) communicate information between network devices 102 and such components. For example, a transmission medium 12 may include an optical fiber, an Ethernet cable, a T1 cable, copper cable, a WiFi signal, a Bluetooth signal, or other suitable medium.

A local area network (LAN) 112 may include a network that couples computers, devices, network elements, and/or other components in a limited geographical area (e.g., a home, school, computer laboratory, office building, etc.). On the other hand, wide area network (WAN) 110 may include a computer network that covers a broad geographical area. For example, WAN 110 may couple network elements 102 to each other across metropolitan, regional, national, and/or other boundaries. Although not shown in FIG. 1, WAN 110 may include network elements and/or transmission media facilitating communication of information between network elements 102.

Each network element 102 in network 10 may comprise any suitable system operable to transmit and receive traffic. In the illustrated embodiment, each network element 102 may be operable to transmit traffic to one or more other network elements 102 and receive traffic from the one or more other network elements 102 (e.g., via WAN 110). In addition, each network element 102 may be operable to transmit and/or traffic from one or more components of a LAN 112. As depicted in FIG. 1, network element 102 may include a processor 103, a memory 104, a switching element 105, and one or more network interfaces 106 communicatively coupled to switching element 105.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of network element 102. Although FIG. 1 depicts processor 103 as independent of other components of network element 102, in some embodiments one or more processors 103 may reside on network interfaces 106 and/or other components of network elements 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off Although FIG. 1 depicts memory 104 as independent of other components of network element 102, in some embodiments one or more memories 104 may reside on network interfaces 106 and/or other components of network element 102. Memory 104 may have stored thereon one or more programs of instructions configured to, when read and executed by processor 103, perform the various functionality of a network element 102, as described elsewhere herein.

As shown in FIG. 1, a memory 104 may have stored thereon a software-based protection switching module 114. Software-based protection switching module 114 may comprise any program of instructions that may be read by a processor 103 and executed by processor 103 in order to control protection switching in order to throttle interrupts and/or prevent frequent toggling between working path 118 and protection path 120, as described in greater detail below.

A switching element 105 may include any suitable system, apparatus, or device configured to receive traffic via network element 106 and forward such traffic to a particular network interface 106 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 105 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. A network interface 106 may include one or more physical ports. Each such physical port may include any system, device or apparatus configured to serve as a physical interface between a corresponding transmission medium 12 and the network interface 106. For example, a physical port 110 may comprise an Ethernet port, an optical port, or any other suitable port.

As shown in FIG. 1, one or more network elements 106 may include a hardware-based protection switching module 116. Hardware-based protection switching module 114 may comprise any system, device, or apparatus configured to control protection switching in order to throttle interrupts and/or prevent frequent toggling between working path 118 and protection path 120, as described in greater detail below. Although each hardware-based protection switching module 116 is depicted in FIG. 1 as integral to a network interface 106, a hardware-based protection switching module 116 may be, in some embodiments, integral to another component of a network element 102 (e.g., a switching element 105), or independent of other components of network element 102.

Network elements 102 may communicate with each other using linear protected switching. Accordingly, network elements 102 may be communicatively coupled to each other through a linearly protected switching connection. The linearly protected switching connection may comprise a working path 118 and a protection path 120. In certain embodiments, the linearly protected switching connection comprising working path 118 and protection path 120 may be configured in accordance with the International Telecommunication Union (ITU) G.8031 standard.

As shown in FIG. 1, working path 118 may include transmission media 12 and a portion of WAN 110. Similarly, protection path 120 may include transmission media 12 and a different portion of WAN 110 which are redundant to the transmission media 12 and portion making up working path 118. In operation, paths 118 and 120 may provide connectivity for communication of traffic between network element 102. In the absence of faults in working path 118, working path 118 may be designated as active, such that traffic between network elements 102 communicated over such active working path 118. In the event of a fault or other event within working path 118, one or more of network elements 102 may cause a protection switch of the traffic from the active working path to the protection path 120. In certain embodiments, such protection switching may be implemented in accordance with the ITU G.8031 standard.

Protection switching from one path to another may occur in response to any suitable event. For example, fault of a working path 118 may cause a switchover to protection path 120. As a further example, a switchover may occur in response to a human-initiated action (e.g., a command to switchover issued by a network operator/administrator). All such events may be monitored by network elements 102 and all such monitoring may be synchronized between network elements 102 in any suitable manner. For instance, protection switching synchronization between network elements 102 may be maintained via communication of suitable messages, for example Automatic Protection Switching (APS) messages communicated between network elements 102 via protection path 120 in accordance with the ITU G.8031 standard.

During operation, working path 118 and protection path 120 may be configured in accordance with any suitable redundancy scheme. For example, a 1:1 scheme may be used in which all traffic is communicated over working path 118 and is protection switched to the other protection path 120 in response to an event. In addition, the linearly protected switching connection comprising working path 118 and protection path 120 may be configured to be revertive, meaning that when a fault condition leading to a protection switching event clears, the linearly protected switching connection is configured to switch traffic from protection path 120 to working path 118, thus reverting the traffic to working path 118.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

In certain instances, working path 118 may be subject to intermittent faults that, in the absence of certain methods and systems described herein, may lead to generation of intermittent protection switching interrupts and frequent toggling of traffic between working path 118 and protection path 120. An intermittent fault may be one in which working path 118 may operate normally for periods of time, but intermittently indicate a fault within working path 118 due to a particular problem, sometimes even in cases in which a bona fide failure may not occur. For example, among the reasons an intermittent fault may occur on a working path include, without limitation, a bent transmission medium (e.g., cable or fiber) within working path 118; a cut transmission medium within working path 118; incorrect or lose transmission media connections to network elements of the working path 118; a transmission medium short within working path 118; electromagnetic interference in working path 118; faulty connectors interfacing transmission media to network elements in working path 118; loss of heartbeat messages (e.g., Continuity Check Messages) by network elements of working path 118 due to congestion, collision and/or other cause; and/or a degraded signal along working path 118. As explained above, such intermittent faults may lead to heavy consumption of system resources (e.g., processing and/or memory capacity), which in turn can cause degraded system performance, system instability, and/or system crashes.

In operation, one or more software-based protection switching control modules 114 and one or more hardware-based protection switching control modules 116 may detect a high rate of protection switching (e.g., in the protection switching software layer) and prevent such high rate from stressing a system by employing an exponential backoff algorithm or other mechanism. In addition or alternatively, one or more software-based protection switching control modules 114 and one or more hardware-based protection switching control modules 116 may throttle interrupts that cause protection switching, by detecting an interrupt storm at the hardware layer or a lower layer in software, and using an exponential backoff algorithm or other mechanism to provide hysteresis in protection switching at such level. Functionality of software-based protection switching control modules 114 and hardware-based protection switching control modules 116 may be illustrated in greater detail by reference to FIG. 2, and the description of FIG. 2 below.

Figure 2:
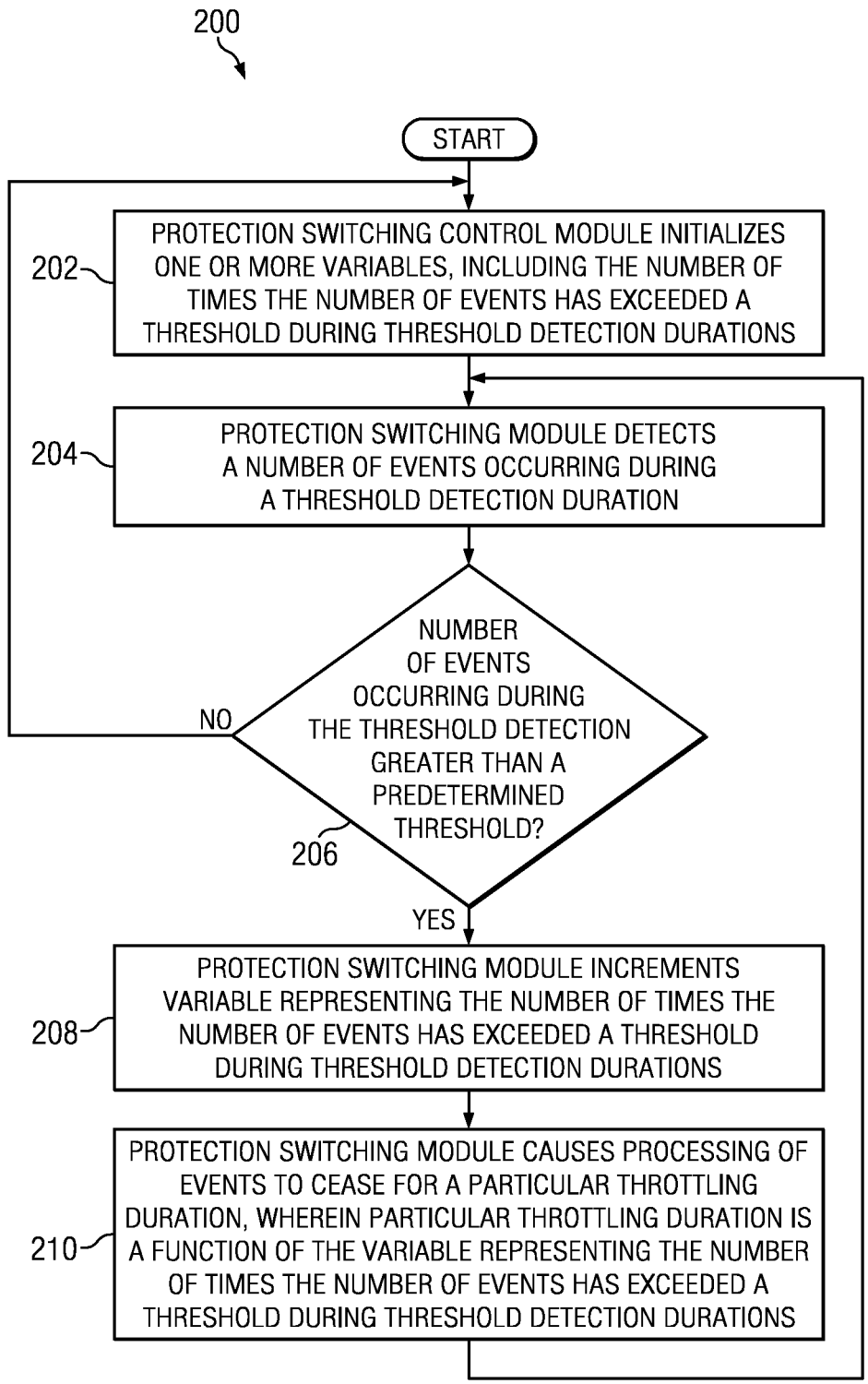
FIG. 2 illustrates a flow chart of an example method for interrupt throttling and prevention of frequent toggling of protection groups in a communication network, in accordance with embodiments of the present disclosure.

FIG. 2 illustrates a flow chart of an example method 200 for interrupt throttling and prevention of frequent toggling of protection groups in a communication network, in accordance with embodiments of the present disclosure. As noted above, teachings of the present disclosure may be implemented in a variety of configurations of network 10. As such, the preferred initialization point for method 200 and the order of the steps 202-210 comprising method 200 may depend on the implementation chosen.

At step 202, a protection switching control module (e.g., software-based protection switching control module 114 and/or hardware-based protection switching control module 116) may initialize one or more variables. For example, the protection switching control module may set a variable (e.g., "z")

representing a number of events (e.g., interrupts or protection group switches) detected during a threshold detection duration to zero, a variable (e.g., "n") representing the number of times the number of events has exceeded a threshold during threshold detection durations to zero, and initialize a timer (e.g., "t") for the threshold detection duration.

At step 204, the protection switching module may, detect a number of events (e.g., "z") occurring during a threshold detection duration.

At step 206, the protection switching module may determine if the number of events (e.g., interrupts or protections switches) occurring during the threshold detection duration exceeds a predetermined threshold. If the number of events does not exceed the predetermined threshold, method 200 may proceed again to step 202, where variables may again be initialized and the protection switching control module may continue event detection for a subsequent threshold detection duration. Otherwise, if the number of events does exceed the predetermined threshold, method 200 may proceed to step 208.

At step 208, in response to a determination that the number of events (e.g., interrupts or protections switches) exceeded the predetermined threshold, the protection switching module may increment the variable (e.g., "n") representing the number of times the number of events has exceeded a threshold during threshold detection durations (e.g., set n=n+1).

At step 210, the protection switching module cause processing of events to cease for a particular throttling duration. In some embodiments, the throttling duration may increase exponentially as the number of times (e.g., "n") the number of events (e.g., "z") has exceeded the predetermined threshold during previous detection durations. For example, the throttling duration may be a random interval $R=[0 \ldots 2^k-1]*w$, where R equals the throttling duration, $[0 \ldots 2^k-1]$ represents a random integer selected from between the values of 0 and $2^k-1$, w equals a predetermined wait interval, and k equals the minimum of: (i) the number of times (e.g., "n") the number of events (e.g., "z") has exceeded the predetermined threshold during previous threshold detection durations, and (ii) a predetermined maximum number (e.g., 10, ∞, or other suitable number). In other embodiments, the throttling duration may be equal to $(2^k-1)*w$, where w equals a predetermined wait interval, and k equals the minimum of: (i) the number of times (e.g., "n") the number of events (e.g., "z") has exceeded the predetermined threshold during previous threshold detection durations, and (ii) a predetermined maximum number (e.g., 10, ∞, or other suitable number). After expiration of the throttling duration, method 200 may proceed again to step 204, where the protection switching control module may continue event detection for a subsequent threshold detection duration.

In implementations in which detected events comprise interrupts, various variables and thresholds may be determined, selected, or tuned based on provisioned components (e.g., maintenance end points in network 10). For example, assuming that a protection switching toggle can happen within 15 ms, the threshold detection duration may be set to 15 ms. As another example, if a system maximum of 4K maintenance end points exists, the predetermined threshold might be set to 2,000. As a further example, the predetermined wait interval (e.g., "w") may be set to a multiple of the threshold detection duration (e.g., 150 ms).

In implementations in which detected events comprise protection switches, various variables and thresholds may be determined, selected, or tuned based on provisioned components (e.g., maintenance end points and/or protection switching groups in network 10). For example, assuming protection switching software that results in 60% processor utilization at ten switches per second, the threshold detection duration may be set to 1 second, the predetermined threshold might be set to 10, and the predetermined wait interval (e.g., "w") may be set to a multiple of the threshold detection duration (e.g., 10 seconds).

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using network 10 or any other system operable to implement method 200. In certain embodiments, method 200 may be implemented partially or fully in software and/or firmware embodied in computer-readable media.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method comprising:
   determining, by a network element, a first plurality of events occurring during a predetermined first threshold detection duration, wherein the events comprise protection switches between a working path and a protection path coupled to the network element or interrupts associated with protection switches between the working path and the protection path;
   in response to determining that the first plurality of events occurring during the first threshold detection duration is greater than a predetermined threshold, causing protection switching by the network element to cease for a first throttling duration of a first length;

determining, by the network element, a second plurality of events occurring during a predetermined second threshold detection duration; and in response to determining that the first plurality of events occurring during the first threshold detection duration is greater than the predetermined threshold and that the second plurality of events occurring during the second threshold detection duration is greater than the predetermined threshold:

determining, by the network element, a second throttling duration of a second length, the second length being greater than the first length; and causing protection switching by the network element to cease for the second throttling duration after the occurrence of the second plurality of events.

2. A method according to claim 1, the second throttling duration based at least on a number of threshold detection durations for which the predetermined threshold has been exceeded.

3. A method according to claim 2, the second throttling duration a function of an exponent of the number of threshold detection durations for which the predetermined threshold has been exceeded.

4. A method according to claim 1, the second throttling duration equal to a random interval $R=[0 \ldots 2^k-1]*w$, where R equals the throttling duration, $[0 \ldots 2^k-1]$ represents a random integer selected from between the values of 0 and $2^k-1$, w equals a predetermined wait interval, and k equals the minimum of: (i) number of threshold detection durations for which the predetermined threshold has been exceeded, and (ii) a predetermined maximum number.

5. A method according to claim 1, the second throttling duration equal to $(2^k-1)*w$, where w equals a predetermined wait interval, and k equals the minimum of: (i) number of threshold detection durations for which the predetermined threshold has been exceeded, and (ii) a predetermined maximum number.

6. A network element, comprising:
a processor;
a memory, the memory having a software-based protection switching module stored thereon, the software-based protection switching module configured to, when read and executed by the processor:
determine a first plurality of events occurring during a predetermined first threshold detection duration, wherein the events comprise protection switches between a working path and a protection path coupled to the network element or interrupts associated with protection switches between the working path and the protection oath;
in response to determining that the first plurality of events occurring during the first threshold detection duration is greater than a predetermined threshold, cause protection switching to cease for a first throttling duration of a first length;
determine a second plurality of events occurring during a predetermined second threshold detection duration; and
in response to determining that the first plurality of events occurring during the first threshold detection duration is greater than the predetermined threshold and that the second plurality of events occurring during the second threshold detection duration is greater than the predetermined threshold:
determine a second throttling duration of a second length, the second length being greater than the first length; and
cause protection switching by the network element to cease for the second throttling duration after the occurrence of the second plurality of events.

7. A network element according to claim 6, the second throttling duration based at least on a number of threshold detection durations for which the predetermined threshold has been exceeded.

8. A network element according to claim 7, the second throttling duration a function of an exponent of the number of threshold detection durations for which the predetermined threshold has been exceeded.

9. A network element according to claim 6, the second throttling duration equal to a random interval $R=[0 \ldots 2^k-1]*w$, where R equals the throttling duration, $[0 \ldots 2^k-1]$ represents a random integer selected from between the values of 0 and $2^k-1$, w equals a predetermined wait interval, and k equals the minimum of: (i) number of threshold detection durations for which the predetermined threshold has been exceeded, and (ii) a predetermined maximum number.

10. A network element according to claim 6, the second throttling duration equal to $(2^k-1)*w$, where w equals a predetermined wait interval, and k equals the minimum of: (i) number of threshold detection durations for which the predetermined threshold has been exceeded, and (ii) a predetermined maximum number.

11. A network element, comprising:
a processor; and
a hardware-based protection switching module stored thereon, the hardware-based protection switching module configured to, when read and executed by the processor: determine a first plurality of events occurring during a predetermined first threshold detection duration, wherein the events comprise protection switches between a working path and a protection path coupled to the network element or interrupts associated with protection switches between the working path and the protection path;
in response to determining that the first plurality of events occurring during the first threshold detection duration is greater than a predetermined threshold, cause protection switching to cease for a first throttling duration of a first length;
determine a second plurality of events occurring during a predetermined second threshold detection duration; and
in response to determining that the first plurality of events occurring during the first threshold detection duration is greater than the predetermined threshold and that the second plurality of events occurring during the second threshold detection duration is greater than the predetermined threshold:
determine a second throttling duration of a second length, the second length being greater than the first length; and
cause protection switching by the network element to cease for the second throttling duration after the occurrence of the second plurality of events.

12. A network element according to claim 11, the second throttling duration based at least on a number of threshold detection durations for which the predetermined threshold has been exceeded.

13. A network element according to claim 12, the second throttling duration a function of an exponent of the number of threshold detection durations for which the predetermined threshold has been exceeded.

14. A network element according to claim 11, the second throttling duration equal to a random interval $R=[0 \ldots 2^k-1]*w$, where R equals the throttling duration, $[0 \ldots 2^k-1]$ represents a random integer selected from between the values of 0 and $2^k-1$, w equals a predetermined wait interval, and k equals the minimum of: (i) number of threshold detection durations for which the predetermined threshold has been exceeded, and (ii) a predetermined maximum number.

15. A network element according to claim 11, the second throttling duration equal to $(2^k-1)*w$, where w equals a predetermined wait interval, and k equals the minimum of: (i) number of threshold detection durations for which the predetermined threshold has been exceeded, and (ii) a predetermined maximum number.

\* \* \* \* \*